Sept. 29, 1942.   L. W. HUMFELD   2,297,303
CARBON RESISTANCE TOOL
Filed April 15, 1941
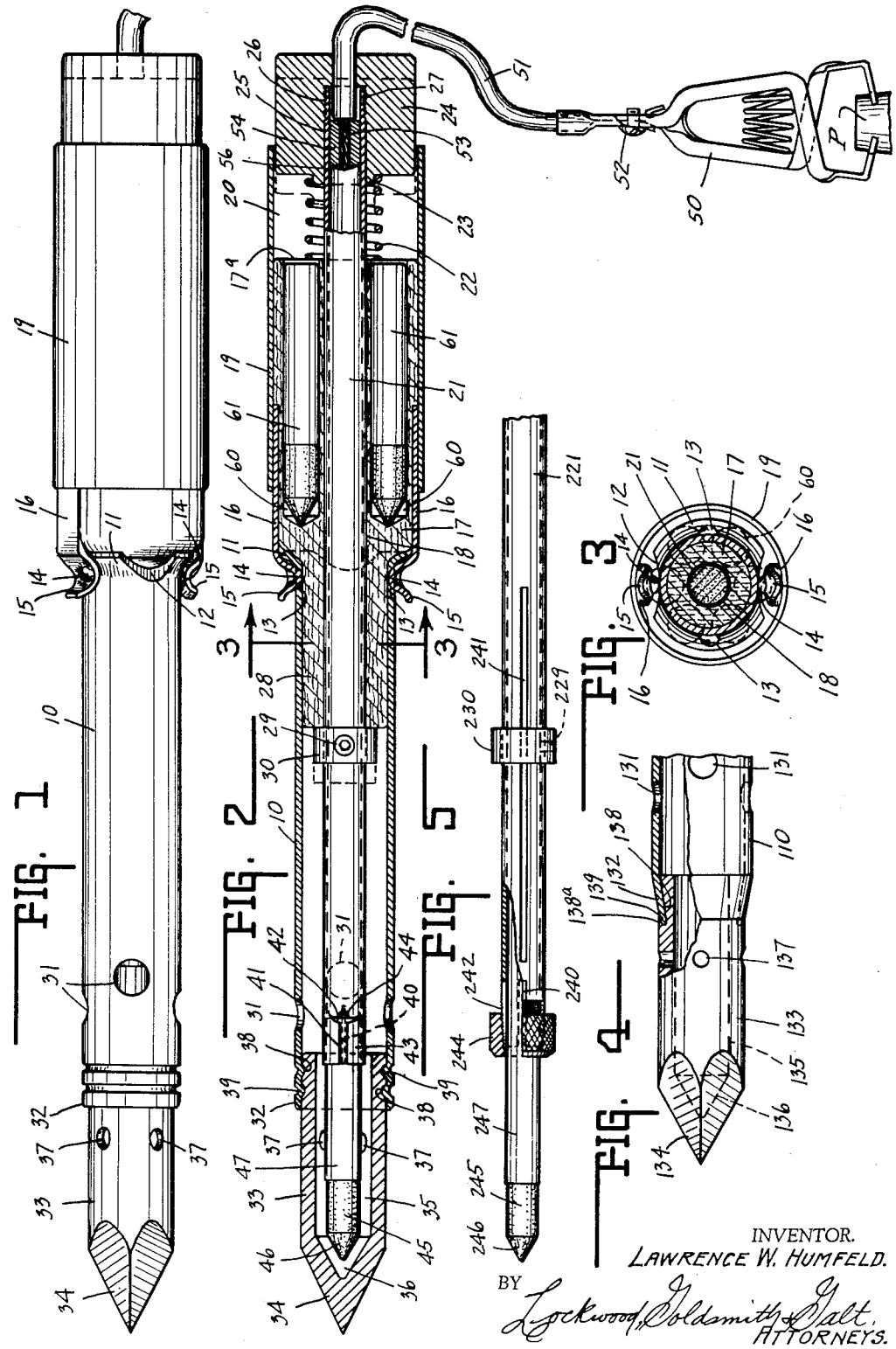
INVENTOR.
LAWRENCE W. HUMFELD.
BY
Lockwood, Goldsmith & Galt,
ATTORNEYS.

Patented Sept. 29, 1942

2,297,303

UNITED STATES PATENT OFFICE 2,297,303

CARBON RESISTANCE TOOL

Lawrence W. Humfeld, Frankfort, Ind., assignor to Humfeld-Hodgen Prod. Co., Frankfort, Ind., a copartnership consisting of Lawrence W. Humfeld and John H. Hodgen Application April 15, 1941, Serial No. 388,656

8 Claims. (Cl. 219—26)

This invention relates to a carbon resistance heating tool.

The chief object of this invention is to provide a tool which can be used as a soldering iron, a high temperature heating unit for local heating purposes, or a welding tool for welding with or without the assistance of an arc, depending upon the material required or utilized for welding.

The chief feature of the invention consists in providing an elongated element terminating in a carbon resistance unit, and which for energy may be readily associated for local repair purposes, with the storage battery of an automobile, and the like, or the starter terminal of such vehicle, and which invention in one form includes a tubular projection for carbon resistance protection purposes as well as for forming a soldering point so that the tool may be used as a soldering iron where primary heat might be so excessive as to burn the metal to be repaired or united.

The chief feature of the invention consists in constructing a tool capable of accomplishing the several foregoing objects and which tool is characterised by its extreme simplicity, its safety in use and by its long life.

Other objects and features of the invention will be set forth more fully hereinafter.

The full nature of the invention will be understood from the accompanying drawing and the following description and claims:

In the drawing, Fig. 1 is a plan view of the major and primary portion of the unit showing the invention in the form of a soldering iron.

Fig. 2 is a longitudinal sectional view of the same with the current supply line and terminal clamp shown in elevation.

Fig. 3 is a transverse sectional view taken on line 3—3 of Fig. 2 and in the direction of the arrows.

Fig. 4 is an elevational view of a modified form of soldering tip structure, parts being broken away to show the same in section.

Fig. 5 is an elevational view of a modified form of carbon resistance and supporting tube structure, parts being broken away to show the same in section.

In Figs. 1 to 3 of the drawing, the numeral 10 indicates an elongated tube which has an outwardly flared rear end 11 and the flange so formed is relieved or cut away as at 12 or at diametrically opposite points. Midway therebetween, the flange and tube junction is relieved forming a seat 13, for the reception of the inwardly directed portion 14 of a yieldable tongue 15 carried by an arm 16, the same being secured to a handle portion.

This handle portion includes a main body 17 centrally apertured as at 18 and suitably secured thereto in enveloping relation is the oppositely directed shell or tube 19 forming at the outwardly and rearwardly projecting end a chamber 20.

Slidably supported in the bore 18 is a tube 21 and concentric with said tube and in the chamber 20 is a coil spring 22, the latter having one end bearing on the face 17a of the body portion 17. The opposite end of said spring is associated with a projecting portion 23 carried by a composition member 24. This composition member 24 is recessed at 25 and the latter is tapped as at 26 to receive the rearwardly directed end of the tube 21, the latter being threaded as at 27. The spring 22 normally constrains tube 21 and closure member 24 to the full line position shown in Figs. 1 and 2. However, when pressure is applied to this member, and in the direction of the shell 19, the tube 21 is projected forwardly and then the member 24 occupies the dotted line position shown in Figs. 1 and 2.

The body portion 17 includes a reduced extension 28 and the same is considerably elongated to form a bearing for the tube 10. It also serves as a spacer spacing the tube 21 from the tube 10 and insures concentric positioning of the tubes at all sections.

The tube 21 has suitably secured to it as at 29 a collar 30. When the member 24 is moved inwardly into chamber 20 under manual pressure and held therein, the collar 29 moves from the full line position shown in Fig. 2 to the dotted line position.

The outer end, as it were, of the tube 10 includes two pairs of diametrically positioned ventilating apertures 31 and these are slightly offset in transverse sectional arrangement, as shown in Figs. 1 and 2, for structural strength retention purposes. The free end 32 of the tube 10 or the end opposite the flared portion 11 is adapted to slidably receive a soldering iron tip structure indicated generally by the numeral 33 and having the conventional tip formation 34. This differs from the conventional soldering iron tip by being hollowed out as at 35, and the forward end of that bore is closed as at 36 and with a suitable conformation. Apertures 37 are provided in this tip structure adjacent the connection of the tip structure to the tube 10.

Herein one method of such connection is for the portion 33 adjacent its open end to be provided with one or more grooves 38. The soldering tip is inserted in the free end 32 of the tube 10 and then the latter at the free end is rolled into the grooves 38 as indicated at 39, thus locking the tip and tube together as a unit. Any other desired locking connection of permanent character may be utilized. It will be apparent from the foregoing that this tip and tube construction constitutes an accurately aligned arrangement, the bore 35 having its longitudinal axis coincident with the axis of the tube 10.

Reference now will be had to Fig. 4. In said figure there is illustrated a modified form of connection between the resistance protecting tube 110 and the soldering point 133. Herein numerals of the 100 series indicate like or equivalent parts. It will be noted in Fig. 4 that the rear end of the soldering point structure 133 is grooved annularly as at 138 and that the end 132 of the tube 110 is turned inwardly so that the free end 139 thereof is seated in the root of said groove 138. The shoulder 138a locks the soldering tip structure to the supporting tube 110. Any other desired and relatively permanent connection may be utilized.

Reference now will be had more particularly to Fig. 2. In this figure the tube 21, mounting the stop collar 30, is extended forwardly and the open end thereof is slit longitudinally as indicated at 40. Diametrically opposite the same is a split portion 41 which at its inner end is provided with diverging slits 42 forming confronting tongues 43. The portion 44 immediately adjacent the split or slits 42 is indented or depressed as illustrated forming a stop or shoulder arrangement. The two tongues 43 in conjunction with the remainder of the free end of the tube 21 and by reason of the split 40 opposite the tongue formation forms a gripping socket for a carbon resistance electrode, the same being indicated by the numeral 45 and having a tip 46 substantially conforming to the end 36 of the bore 35 in the soldering tip member 33. The carbon unit 45 is preferably copper sheathed or clad as at 47. The copper clad carbon element 45, therefore, is rigidly secured to the tube 21 and in axial alignment with the tube and projects forwardly thereof.

There is provided—see Fig. 2—a terminal contact and clamping clip structure indicated generally by the numeral 50. It is adapted to engage a battery post P, the positive terminal of a storage battery, or it is adapted to clampingly engage the starter terminal in an automobile. An insulated line 51 is in electrical connection with the clip 50 as at 52 at one end and at its opposite end has the current conducting wire portion 53, secured in a sleeve 54 of metallic character and carried by the other end of the tube 21, from which the carbon member is supported. This sleeve may be suitably secured to the tube 21 and the wire 53 may be suitably secured to the sleeve. Solder 56 is such a method of anchorage.

It, therefore, will be apparent that when the clip 50 is clamped to the positive terminal of the battery on an automobile that the carbon member 45 is in electrical connection with the battery. The circuit, however, is not completed back to the battery and thus the unit or tool is at this time functionless so long as the tube 10 and welding tip structure 33 are associated therewith.

The position of the collar 30 is such that the extension movement of the tube 21 rearwardly toward the right in Fig. 2 is limited and hence, the member 24 never escapes from the tube 19 or from chamber 20 thereof. The tube 21 has sufficient travel so that the tip 46 of the carbon terminal 45 can engage the tip wall 36 of the bore 35 of the soldering tip structure 33—34. This occurs when the member 24 is moved inwardly into chamber 20 and as long as the surfaces 36 and 46 are in contact and any portion of the copper tip structure 33 or the metallic tube 10 is in contact with the metal portion of the automobile, the circuit will be completed through the carbon member 45. While this circuit is completed, the carbon member by reason of its resistance becomes heated and heats to a red glow. At the same time the heat, generated by this carbon resistance—not any arc occurring during this operation—is transmitted to the tip 34. This heats the soldering tip.

A structure of this kind applied to a storage battery of 6–12 volts, the former being the usual voltage of automotive storage batteries, will cause, when the carbon member contacts the tip, a heating of the tip in from thirty to less than sixty seconds. Such heating is sufficient for soldering purposes.

The temperature of this tip is such that it does not melt the metal of the material to be soldered. It also will be apparent that the circuit may be broken at any time by merely releasing the member 24 to its constraint. As soon as the soldering iron construction cools to the point where soldering operation cannot be properly effected, the circuit again is closed by moving member 24 inwardly and having the soldering iron contact a portion of the automobile frame, et cetera, and the soldering iron is reheated.

As before stated, there is no arcing and consequently, there is but very little disintegration or wear of the carbon element. An element of this character usually will last for approximately six months or more.

The openings 37 in the soldering iron tip will show a workman the heated condition of the carbon element. The apertures 31 in the tube 10 provide for ventilation of the structure rearwardly of the tip. Therefore, air which enters at 37 may escape at 31, or vice versa, thus insuring a comparatively cooler rear end of tube 21 and tube 10.

Whenever it is desired to utilize the aforesaid tool as a heating element for heating a nut, or the like, in order to free it from a bolt, the tube 10 and tip 33—34 is rotated axially 90° until the clips 14—15 register with the notches 12 in the flange 11, and thereupon the protective arrangement can be axially separated from the handle and carbon electrode holding portion. When this has been accomplished, the clamp 50 can be engaged with the positive terminal of the battery, as shown. When the carbon tip 46 is placed in contact with the nut or other portion to be heated, the current flows through this carbon resistance or pencil element, through the article or portion to be heated and thence back to the battery by way of ground connection. The heat generated by the carbon resistance, incident to the flow of low voltage current of considerable amperage therethrough, will cause the heating of the nut or like element. When properly heated, the tool is removed from the aforesaid contact and the heated portion manipulated, as desired or required.

Care is to be observed in the handling of the tool in this condition because, first, the carbon resistance element is unprotected and, second, because the switch structure arrangement is not effective for current control as is the case when the entire tool is utilized as a soldering iron.

Whenever it is desired to weld, braze, or otherwise utilize a very high temperature for a high temperature operation, the brazing rod or welding stock rod is held in contact with the exposed carbon element 45 and the latter is applied at the point 46 and to the article in ground connection with the battery for completing the carbon resistance circuit. When the circuit is completed, the tool is separated slightly from the surface, thus providing an arc of carbon character and in this arc is positioned, as aforesaid, the stock material utilized for brazing or welding purposes. As this material melts, it is flowed on to the part, or parts, to be secured together, et cetera, and in that manner the tool is capable of operating as an arc welding unit.

In this form of the invention, naturally the carbon gradually oxidizes and the carbon pencil is reduced in length and it gradually is exhausted to the point where it is no longer capable of being moved into position to contact the surface 36 of the soldering iron tip when the tool is to be used as a soldering iron. When this occurs the carbon pencil is removed and a new pencil is substituted.

It will be noted that the carbon pencil is, as previously stated, sheathed as at 47. The heat in the carbon unit as it wears back gradually melts this sheathing and this material oxidizes, et cetera. This sheathing, which may be a thin copper coat, is of current carrying capacity, and insures intimate contact with the carbon so that proper circuit connection is obtained therebetween.

As shown clearly in Figs. 2 and 3, the wooden body portion 17 may be provided with a series of spaced longitudinal bores 60, each adapted to receive a surplus carbon pencil, indicated by the numeral 61. The spring 22 bearing on the end 17a normally retains these carbon pencils in said bores 60, the bearing of the spring 22 being effective on the face 17a and these bores 60 are exposed on said face. Access is had to these bores in the following manner:

The member 24 is rotated counterclockwise to unthread the same from the tube 21. When unthreaded this member 24 is slid along the protected conductor structure 53—51 and the spring 22 is likewise moved therewith. Then any one of the pencils 61 may be removed from the bore 60 and then the structure reassembled. The exhausted pencil is removed from the socket at the forward end of the tube 21 and the replacing pencil substituted therefor.

It also will be understood, if desired, the several holes 37 and 31 may be provided with screen material, pressed therein and this to a certain extent in many instances, will prevent ignition of combustible mixtures, when the tool is to be used as a soldering iron. For clearness such screen additions are intentionally omitted.

It is to be observed that when used as a soldering iron, this tool requires the closing of the circuit by the inward pressure maintenance of member 24 so that tip 46 of the pencil engages surface 36 of the soldering iron tip structure.

The safety feature of the aforesaid will be obvious for example. Without this switch or circuit control arrangement, if a mechanic working on an automobile be called away, immediately upon leaving the tool the current is disconnected, as it were, or the circuit broken because contact between the portions 36 and 46 is not maintained so that no damage can result therefrom. Were it not for this fact, the tool could become so highly heated it would burn through the material through which it was grounded to the battery.

A modified form of carbon pencil and tube support arrangement is shown in Fig. 5. Herein numerals of the 200 series indicate like or similar parts. Thus, the tube 221 herein is provided with the collar 230 secured as at 229 thereto in adjusted relation. This tube at its free end is longitudinally split as at 240. Four of these longitudinal splits are illustrated and the exterior surface of the tube 221 at its pencil receiving end is threaded as at 242. An internally taper threaded nut 244 is associated therewith and is adapted to clamp the carbon pencil 245 having the tip 246 and copper clad as at 247 in the tube 221.

The tube 221 is herein illustrated as provided with an elongated slot 241. This slot 241 is provided to adjust the position of the elongated pencil or electrode by the use of a knife, or the like, construction in the slot behind the carbon element and when the nut 244 is sufficiently unthreaded. The tube 221 then permits free movement of the carbon terminal longitudinally of the tube. In maintaining the soldering position condition of the terminal, it will be understood that the nut 244 is sufficiently released and the carbon electrode extended a sufficient amount which is in excess of that estimated to be necessary to form the contact between the soldering iron tip and the tip of the carbon terminal. Then the tube shown in Figs. 1 and 2 together with the soldering iron tip is applied to the handle portion in the normal carbon terminal protecting position and soldering iron tool formation. In this operation the tip 246 of the carbon terminal is caused to be moved rearwardly an amount necessary to insure contact of tip 246 with the face 36 of the soldering iron tip structure.

Thereupon, the soldering iron tube and tip transformation and carbon terminal protective arrangement is removed from the handle structure and the nut 244 threaded so as to cause the split portions of the tube 221 at the free end of the tube to rigidly clamp the carbon terminal in proper position. Then the combination tube and soldering iron tip is reapplied and the tool is ready for use as a soldering iron. Other equivalent forms of adjustable support means, as it were, for carbon terminals may be utilized.

In both forms of the invention shown more clearly in Figs. 2 and 5, it is quite clear that the collar 30 or 230, tube 21 or 221, and the nut 244 are of such diameters that no part of the same engages the tube 10 or the body portion 33 of the soldering iron tip and protective tube arrangement except at the surface 36, thereby insuring proper operation at all times and preventing accidental short circuiting of the carbon resistance or heating element; so that, it is not a part of the heating circuit, unless intentionally maintained as such.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A carbon resistance multi-purpose heating tool suitable for soldering as well as arc welding purposes including in combination an insulation handle having a bore therethrough, a carbon resistance electrode of pencil type, an elongated support slidable in the bore and projecting from the handle and supporting the electrode at the projecting end, a soldering tip, substantially tubular means telescopically associated with the handle end from which the support projects and substantially enveloping the support and carbon electrode, the interior of the tip being arranged for electrode contact, cooperating means on the adjacent telescopically associated ends of the tubular means and handle detachably connecting same together for soldering purposes and permitting ready separation for tubular means and tip removal for arc welding purposes, the addition of hand engageable means carried by the opposite end of the support and slidably associated with the handle at the opposite end thereof and normally constrained toward a direction opposite from the electrode, and stop means carried by the support, nestable within the tubular means when the latter is handle carried, and cooperating with the first mentioned end of the handle for limiting electrode movement away from the tip when the latter is carried by the handle.

2. A carbon resistance multi-purpose heating tool suitable for soldering as well as arc welding purposes including in combination an insulation handle having a bore therethrough, a carbon resistance electrode of pencil type, an elongated support slidable in the bore and projecting from the handle and supporting the electrode at the projecting end, a soldering tip, substantially tubular means telescopically associated with the handle end from which the support projects and substantially enveloping the support and carbon electrode, the interior of the tip being arranged for electrode contact, cooperating means on the adjacent telescopically associated ends of the tubular means and handle detachably connecting same together for soldering purposes and permitting ready separation for tubular means and tip removal for arc welding purposes, the major portion of the carbon pencil having a metallic sheath covering same.

3. A carbon resistance multi-purpose heating tool suitable for soldering as well as arc welding purposes including in combination an insulation handle having a bore therethrough, a carbon resistance electrode of pencil type, an elongated support slidable in the bore and projecting from the handle and supporting the electrode at the projecting end, a soldering tip, substantially tubular means telescopically associated with the handle end from which the support projects and substantially enveloping the support and carbon electrode, the interior of the tip being arranged for electrode contact, cooperating means on the adjacent telescopically associated ends of the tubular means and handle detachably connecting same together for soldering purposes and permitting ready separation for tubular means and tip removal for arc welding purposes, the tubular means including an outwardly directed flange on its handle associable end, said handle having a reduced portion receivable thereby, said cooperating means including finger-like clip means having an inwardly directed free end, and projecting from the end of the handle closest to the electrode and toward the same, said flange being notched longitudinally for the longitudinal passage of the clip means' inwardly directed free end toward the junction of the flange and tubular means until the free end registers with the junction, and locking seat means in the junction of the flange and tubular means and peripherally remote from the flange notching for clip means free end seating when rotated thereto from notch position.

4. In combination a handle member having an open chamber in one end, and a bore therethrough communicating with the chamber, elongated means slidable in the bore, a chamber closing member carried by the means at one end thereof, said members having telescopic association, yielding means in the chamber normally tending to separate said telescopic association, stop means on the elongated means opposite the closure member and with the handle member therebetween and adapted for handle member engagement for limiting the separation movement, the opposite end of the elongated means including a socket arrangement, and a carbon pencil electrode receivable by said socket arrangement.

5. A combination as defined by claim 4, characterized by the socket arrangement including a longitudinally split end of the elongated means, the latter adjacent the split end having an inwardly directed stop portion for limiting pencil seating movement in the socket arrangement.

6. A combination as defined by claim 4, characterized by the socket arrangement including a longitudinally split end of the elongated means, said split end being externally threaded, a nut threadable thereon for pencil clamping thereby, said elongated means being of tubular character from the split end toward the stop means supported thereby, the pencil being relatively elongated and slidable in the tubular portion of the elongated means, the tubular portion including an elongated longitudinal slot therein for pencil position adjusting purposes.

7. A combination as defined by claim 4, characterized by the socket arrangement including a longitudinally split end of the elongated means, the latter adjacent the split end having an inwardly directed stop portion for limiting pencil seating movement in the socket arrangement, the elongated means being of current conducting character and in electrical connection with the carbon pencil when socket seated, and current conducting means, the closure being apertured and the current conducting means extending through the aperture and having electrical connection with the first mentioned end of the elongated current conducting means.

8. A carbon resistance multi-purpose heating tool suitable for soldering as well as arc welding purposes including in combination an insulation handle having a bore therethrough, a carbon resistance electrode of pencil type, an elongated support slidable in the bore and projecting from the handle and supporting the electrode at the projecting end, a soldering tip, substantially tubular means telescopically associated with the handle end from which the support projects and substantially enveloping the support and carbon electrode, the interior of the tip being arranged for electrode contact, cooperating means on the adjacent telescopically associated ends of the tubular means and handle detachably connecting same together for soldering purposes and permitting ready separation for tubular means and tip removal for arc welding purposes, the handle including therein a plurality of carbon-resistance electrode receivable bores substantially parallel to each other and the longitudinal axis of the handle and opening upon the face of said handle opposite the electrode and tip supporting end thereof, hand engageable means, detachably carried by the opposite end of the support in spaced relation to the bored face of the handle and slidably associated with the handle at the opposite end thereof, yielding means substantially enveloping the support, and interposed between the bored face of the handle and the hand engageable means and constraining the latter and support in the direction opposite the bored face, and stop means carried by the support adapted for handle engagement opposite the bored face thereof, said yielding means normally retaining spare electrodes within the bores and being removable when the hand engageable means is detached to permit of bore loading and spare electrode removal.

LAWRENCE W. HUMFELD.